United States Patent
Phatak et al.

(10) Patent No.: US 8,364,164 B2
(45) Date of Patent: Jan. 29, 2013

(54) CELL ID BASED POSITIONING FROM CELL INTERSECTIONS

(75) Inventors: Makarand Phatak, Sunnyvale, CA (US); Marlene Wan, Sunnyvale, CA (US); Lionel Garin, Palo Alto, CA (US); Vijayaraghavan Venkatasubramanian, San Jose, CA (US); Sanjai Kohli, Manhattan Beach, CA (US)

(73) Assignee: CSR Technology Inc., Sunnyvale, CA (US)

( * ) Notice: Subject to any disclaimer, the term of this patent is extended or adjusted under 35 U.S.C. 154(b) by 729 days.

(21) Appl. No.: 11/464,186

(22) Filed: Aug. 11, 2006

(65) Prior Publication Data

US 2008/0039114 A1 Feb. 14, 2008

(51) Int. Cl.
*H04W 24/00* (2009.01)
*H04M 11/04* (2006.01)
*G01S 3/02* (2006.01)

(52) U.S. Cl. .......... 455/456.1; 379/45; 379/37; 342/457

(58) Field of Classification Search ............... 455/456, 455/422, 432, 457, 440, 456.1; 342/452, 342/357.06, 357.13, 450, 457; 379/60, 59
See application file for complete search history.

(56) References Cited

U.S. PATENT DOCUMENTS

| | | | | |
|---|---|---|---|---|
| 4,891,650 | A | | 1/1990 | Sheffer .................. 342/457 |
| 5,055,851 | A | | 10/1991 | Sheffer .................. 342/457 |
| 5,218,367 | A | | 6/1993 | Sheffer et al. ............ 342/457 |
| 5,602,903 | A | * | 2/1997 | LeBlanc et al. .......... 455/456.2 |
| 5,959,580 | A | * | 9/1999 | Maloney et al. ........... 342/457 |
| 6,198,930 | B1 | * | 3/2001 | Schipper ................. 455/440 |
| 6,362,783 | B1 | * | 3/2002 | Sugiura et al. ............ 342/457 |
| 7,039,421 | B2 | | 5/2006 | Couronne et al. |
| 7,053,831 | B2 | * | 5/2006 | Dempsey et al. .......... 342/463 |
| 7,313,403 | B2 | * | 12/2007 | Gong et al. .............. 455/456.1 |
| 7,319,878 | B2 | * | 1/2008 | Sheynblat et al. ......... 455/456.3 |
| 2005/0014511 | A1 | * | 1/2005 | Spain ................... 455/456.1 |
| 2005/0032531 | A1 | | 2/2005 | Gong et al. |
| 2006/0009235 | A1 | * | 1/2006 | Sheynblat et al. .......... 455/456 |
| 2006/0125692 | A1 | * | 6/2006 | Wang et al. .............. 342/451 |
| 2009/0253436 | A1 | | 10/2009 | Nientiedt |

FOREIGN PATENT DOCUMENTS

| | | |
|---|---|---|
| EP | 1820120 | 10/2006 |
| EP | 1917820 | 3/2007 |
| EP | 1929325 | 3/2007 |
| EP | 1795912 | 6/2007 |
| WO | WO 2009/105054 | 8/2009 |

\* cited by examiner

*Primary Examiner* — Kent Chang
*Assistant Examiner* — Kuo Woo
(74) *Attorney, Agent, or Firm* — Pillsbury Winthrop Shaw Pittman LLP (57) ABSTRACT

Systems and methods are described for determining location of wireless devices using signal strength of signals detected by the wireless devices. The strength of signals received from identifiable sources is typically compared to reference signal strength measurements collected or estimated at known locations. Information identifying the source of the signals is typically obtained from data provided in the signals. Mappers associate combinations of reference signal strengths with geometrically shaped geographical regions such that signal strength measurements can be used as indices to locate a region in which a wireless device can be found. Systems and methods are described for receiving signal strength information from known locations where the information can be used to update and improve mapping system databases.

25 Claims, 8 Drawing Sheets

CELL ID BASED POSITIONING FROM CELL INTERSECTIONS

BACKGROUND OF THE INVENTION

1. Field of the Invention

This invention is related to positioning using non-GPS information when a GPS only solution is not available.

2. Description of Related Art

There is a demand for technology that can determine the geographic location of cellular telephones and other devices. Conventional triangulation methods can be used to locate a transmitter by determining the direction from which signals are received by plural receivers. However, signals received from a wireless device can be relatively weak and triangulation generally requires sensitive directional equipment which must be able to distinguish individual transmitters in a network. Triangulation systems can usually locate only a few devices at any given time and large numbers of triangulation receivers would be required to enable widespread access to triangulation services. Consequently, triangulation systems tend to be economically impractical.

Global positioning systems (GPS) can accurately locate a device by triangulation-like methods involving signals received from multiple satellites. However, implementation of GPS technology in wireless devices can be expensive, may necessitate large form-factor devices and can significantly increase power consumption. Therefore, the disadvantages of providing GPS in space-constrained, cost-sensitive wireless devices deter widespread implementation.

BRIEF SUMMARY OF THE INVENTION

Certain embodiments of the invention overcome the disadvantages apparent in the prior art by utilizing information available to wireless devices for location finding purposes. Certain embodiments include systems and methods for locating a wireless device using signal strengths of signals received from identifiable sources and comparing those signal strengths to reference signal strength measurements collected or estimated at known locations within a geographical area that encompasses the wireless device. Information identifying the source of the signals can be extracted from data in the measured signals and provided to a mapper. The signals can comprise any identifiable signal detected by the wireless device including radio frequency and microwave signals. For example, cellular telephone networks have been built by competing service providers whereby, for every provider, a cellular telephone may be able to detect signals transmitted by different cell sites operated by different providers. In many embodiments, signals from cell sites operated by one or more service providers may be used for location determination.

In certain embodiments, a system for determining location of a wireless device comprises databases and mappers. Mappers typically comprise one or more servers configured to identify regions within a geographic area characterized by measured or estimated strength of signals in regions of the geographic area. Databases can be employed to maintain and update reference signal strength measurements and relationships between signal strengths and regions of the geographic areas. In certain embodiments, mappers and databases can be integrated into a single system operated on one or more server.

In certain embodiments, reference measurements maintained in databases and maps generated by mappers may be updated and augmented using signal strength measurements provided by wireless devices when the location of the wireless device can be independently established or verified. In certain embodiments, wireless devices equipped with global positioning system ("GPS") capabilities can determine location of the wireless devices with great accuracy. Signal strength information derived from such GPS-equipped wireless devices can be used to update reference information associated in the databases and can also provide additional reference points used by mappers.

In certain embodiments, a mapper may receive a plurality of signal measurements from one or more wireless devices wherein the measurements are determined to have been made at proximate locations. These measurements from proximate locations can be aggregated, averaged, filtered, correlated or otherwise processed to obtain or update a current set of signal strength measurements for a region including the one or more proximate locations. The current set of signal strength measurements can be used to update or replace prior reference measurements or can be recorded as new reference measurements.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Whenever convenient, the same reference numbers will be used throughout toe drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

In certain embodiments of the invention, the geographical location of a wireless device can be determined using information related to wireless network infrastructure. This information can include data related to the strength of one or more signals detected by the wireless device. The wireless device can measure signal strengths of identifiable radio frequency, microwave and other electromagnetic signals (hereinafter, collectively referred to as "RF sources") and report the measured signal strengths to a mapper. RF sources can be identified by examining content of information transmitted by the RF source and received by the wireless device. For example, a cell site in a digital cellular telephone network will typically transmit information that can be used to identify the cell site and a service provider associated with signals transmitted by the cell site. Such information can uniquely identify a signal, particularly when combined with information derived from the signal, including signal frequency, modulation, encoding scheme and, where available, directional information.

In certain embodiments, a system for determining the location of a wireless device comprises one or more databases and mappers. Location of a wireless device can be determined within a geographic area by comparing signal strengths measured by the device to reference signal strengths obtained at certain known locations in a geographic area. In certain embodiments, the reference signal strengths may include measurements and estimates and can be expressed as a range of possible signal strengths. Databases can be employed to maintain and update reference signal strength measurements. Mappers can associate regions within a geographic area with reference signal strengths of certain signals associated with the regions. These reference signal strengths may be expressed as a range of expected signal strengths of signals detectable in the region. Mapping data, including information describing regions, can be stored in tables and databases and indexed using signal strengths measured by a wireless device.

In certain embodiments, reference measurements maintained in databases and maps generated by mappers may be updated and augmented using signal strength measurements provided by wireless devices when the location of the wireless device can be independently established or verified. In certain embodiments, wireless devices equipped with global positioning system ("GPS") capabilities can determine location of the wireless devices with great accuracy. Signal strength information derived from such GPS-equipped wireless devices can be used to update reference information in the databases and can also provide additional reference points used by mappers. Hence, certain embodiments can facilitate determination of wireless device location when GPS service is unavailable and can improve system resolution by providing signal strength measurements for locations identified by GPS when GPS service is available to the wireless device. For example, when a GPS-equipped device is used indoors, GPS service may not be available and signal strength measurements may be used to locate the device in certain embodiments of the invention.

In certain embodiments, one or more wireless devices may provide a mapper with signal strength measurements obtained at verifiably proximate locations. These measurements can be aggregated, averaged, filtered, correlated or otherwise processed to obtain a current set of reference signal strengths for geographic regions encompassing the one or more proximate locations. The current set of reference signal strengths can be used to update or replace prior reference signal strengths or can be recorded as new reference measurements.

Figure 1:
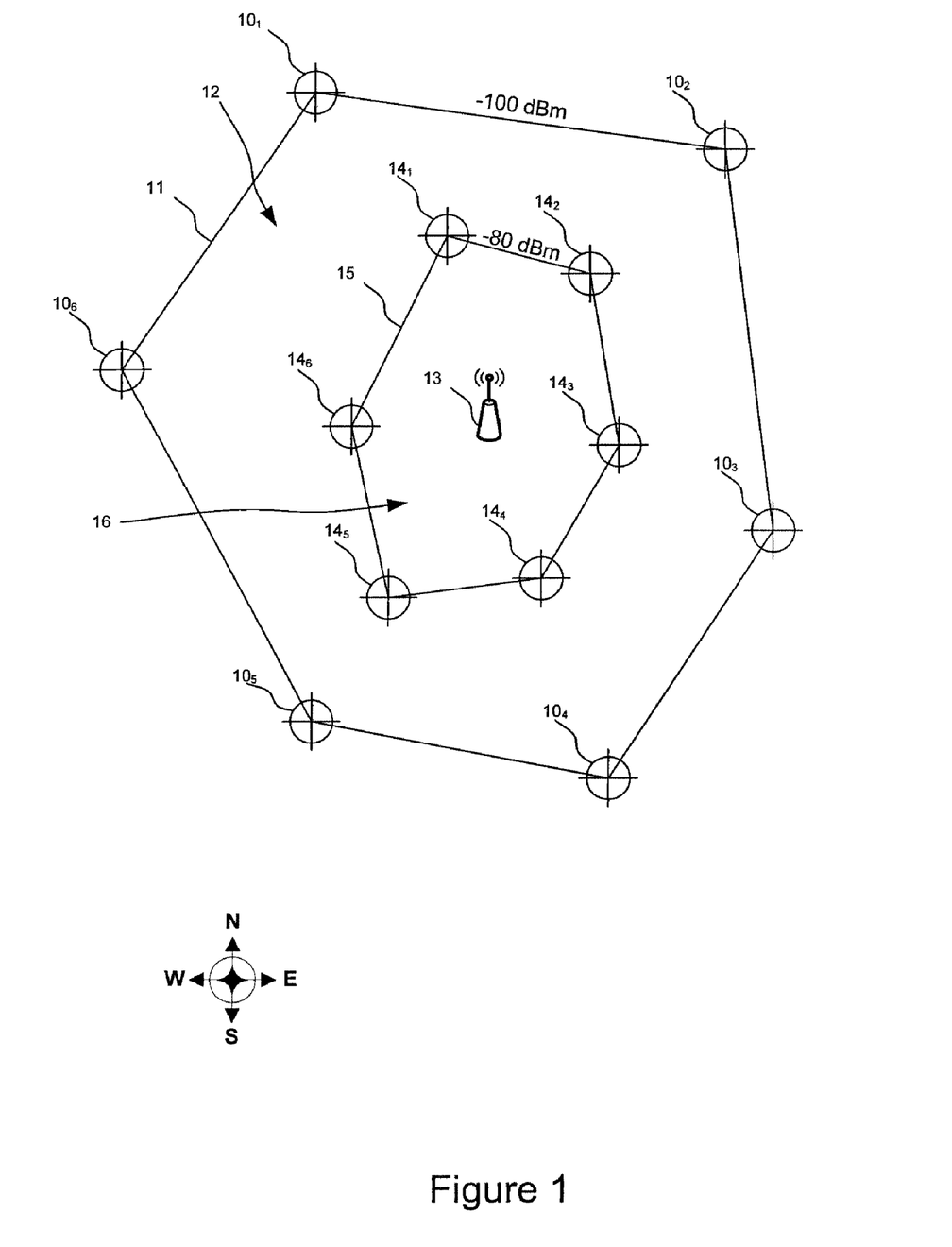
FIG. 1 is an example of a simplified signal strength map for a single RF source.

FIG. 1 illustrates a signal strength map for a single RF source 13. In the example, the strength of a signal received from RF source 13 is known to be −100 dBm at a first set of locations $10_1$-$10_6$. Contour 11 drawn to include the first set of locations $10_1$-$10_6$ and circumscribes the approximate areas 12 and 16 in which signal strength is at least −100 dBm. Further, the strength of the signal is known to be −80 dBm at a second set of locations $14_1$-$14_6$ and contour 15 drawn between the second set of locations $14_1$-$14_6$ circumscribes the approximate area 16 in which signal strength is at least −80 dBm. Thus, signal strength within area 12 located between contours 11 and 15 can be expected to be measured between −100 dBm and −80 dBm.

It will be appreciated that the strength of a signal received at a wireless receiver from RF source 13 can be affected by various factors including distance between receiver and RF source 13, topography of land between and surrounding wireless device and RF source 13, interference from other RF sources, wireless device characteristics, weather and transmission power of RF source 13. Consequently, detectable signal strength can vary considerably even between adjacent locations that are equidistant from RF source 13 and, accordingly, contours may have an irregular shape and distinct contour "islands" may exist in a geographic area.

Contour shape and accuracy in signal strength maps may be a function of the number of locations for which signal strengths measurements are available. Consequently, in certain embodiments, signal strength maps can be generated using a large number of measurements obtained from wardriving or other methods of obtaining bulk measurements. Further, in certain embodiments, signal strength maps may be generated from data that includes estimated signal strengths. Estimated signal strengths can be obtained by interpolation and modeling techniques based on the available measured signal strengths.

In certain embodiments, signal strength maps may be updated when more recent or more accurate signal strength measurements become available. More recent measurements may replace estimated signal strengths and can provide signal strength measurements at previously unrepresented locations, thereby allowing signal strength estimations to be refined. As the number of measured locations increases, it will be appreciated that commensurate improvements in the resolution and accuracy of the map can be expected.

In certain embodiments, signal strength maps may be based on measurements of signal strength obtained at arbitrarily selected locations. A location may be selected in anticipation of receiving future measurements from the location. In some embodiments, estimations may be based solely on a single parameter, such as distance of location from RF source 13. In many embodiments, a plurality of parameters can be used to generate initial estimates of signal strength. The plurality of parameters may include combinations of distance from RF source 13, transmitter location, transmitter height, transmitter power, antenna pattern, elevation of receiver relative to transmitter, line of sight, number and nature of buildings located between transmitter and receiver, radio frequency interference sources, transmitter power, receiver efficiency, weather and so on. In at least some embodiments, signal strengths can be estimated by modeling systems based on propagation models including empirical models, closed form models and ray-tracing models. In certain embodiments, modeling systems may use third party network database information and field measurements to tune models.

Network database information may be obtained using, for example, data generated by ray tracing models based on Geographic Information Systems (GIS) databases.

GIS based systems typically comprise generic computer systems that can be used for creating, storing, analyzing and managing spatial data and in particular geographically-referenced information. The referenced information may comprise one or more parameters including transmitter location, transmitter height, transmitter power, antenna pattern, elevation of receiver relative to transmitter, line of sight, number and nature of buildings located between transmitter and receiver, radio frequency interference sources, transmitter power, receiver efficiency, weather associated with a location information (e.g. latitude, longitude, elevation, zip code).

In certain embodiments, signal strength maps can be used to determine the location of a wireless device. In the example of FIG. 1, signal strength measured for a single transmitter typically yields a location that lies within one of a plurality of generally annular regions 12 and 16, bounded by contour lines 11 and 15 and centered on a RF source 13. Typically, each annular region 12 or 16 delineates a region within which signal strength can be expected to fall within a range of signal strengths identified by contour lines 11 and 15. Thus, a device reporting received signal strength of −95 dBm can be determined to lie within the area 12 bounded by the −100 dBm contour line 11 and the −80 dBm contour line 15 because signal strength in area 12 can be expected to lie between −100 dBm and −80 dBm.

Figure 2:
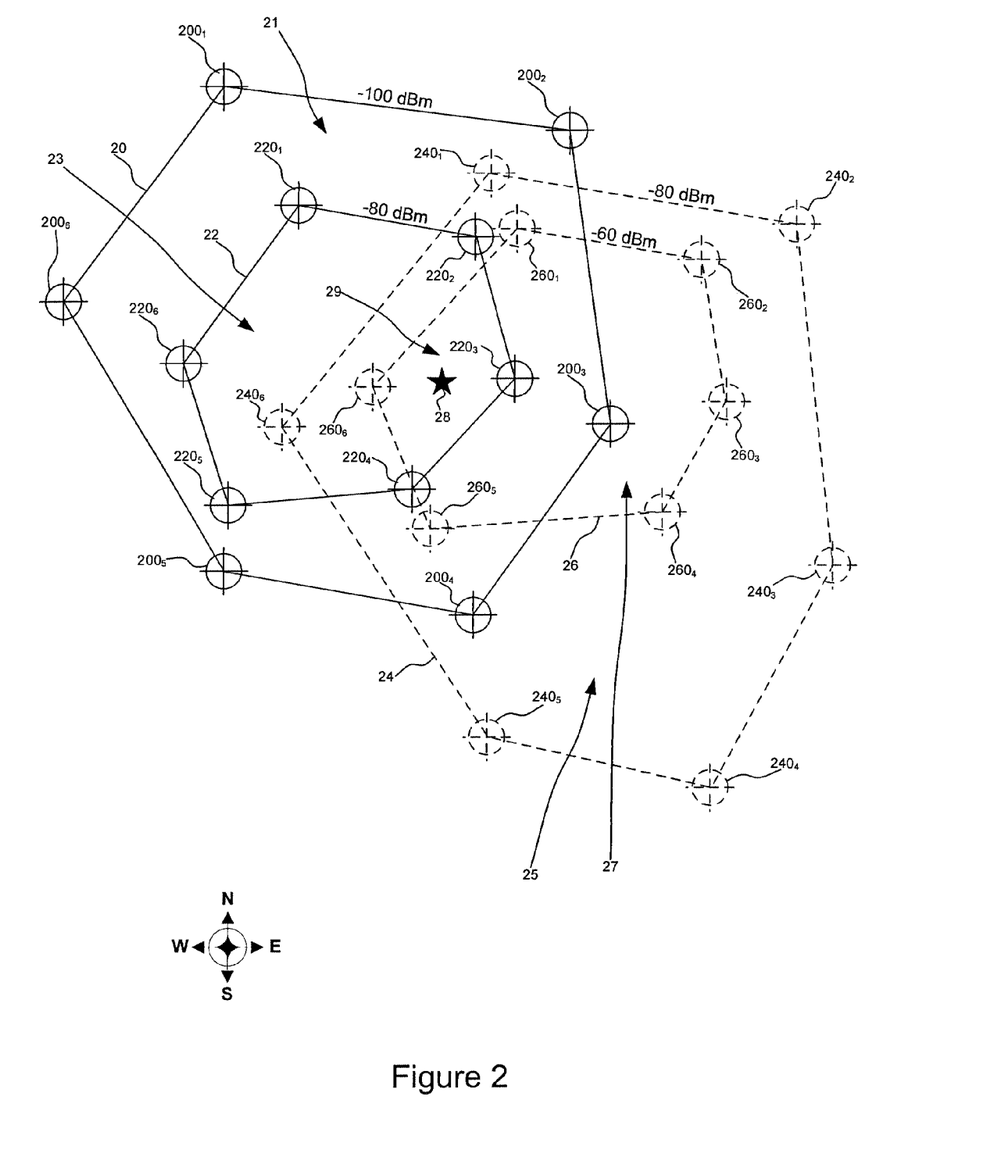
FIG. 2 is an example of a signal strength map for two RF sources.

FIG. 2 illustrates a signal strength map for an example in which two RF sources have coverage areas that intersect and overlap. Signal strength is mapped for a first RF source (not shown) including −100 dBm contour 20 that connects measured locations $200_1$-$200_6$, and −80 dBm contour 22 that connects measured locations $220_1$-$220_6$. Signal strength is mapped for a second RF source (not shown) including −80 dBm contour 24 that connects measured locations $240_1$-$240_6$, and −80 dBm contour 26 that connects measured locations $260_1$-$260_6$. A wireless device located within the coverage areas of both RF sources at point 28 can measure signal strengths of both RF sources and can relay these measurements to a mapper. Mapper may estimate a region 29 in which the wireless device can most likely be found by matching the measurements to expected signal strengths within the region. In the example of FIG. 2, signal strength measured for the first RF source may be −64 dBm and signal strength measured for the second RF source may be −49 dBm. According to the coverage map in this simple example, only area 29 provides for this combination of measured signal strengths.

It will be appreciated that, where signal strength measurements are available for more than one RF source, more than one region may be identifiable with any given set of measured signal strengths or signal strength ranges. It will be appreciated that, while the presence of signals from additional transmitters may reduce the size of the region in which the wireless device could be located, the region may be fragmented and the fragments may be disjoint and irregularly shaped. This fragmentation can substantially increase the complexity of databases and mappers. Accordingly, certain embodiments of the present invention provide methods for consolidating and shaping certain fragments to provide more manageable regions associated with combinations of measured signal strengths.

Figure 3:
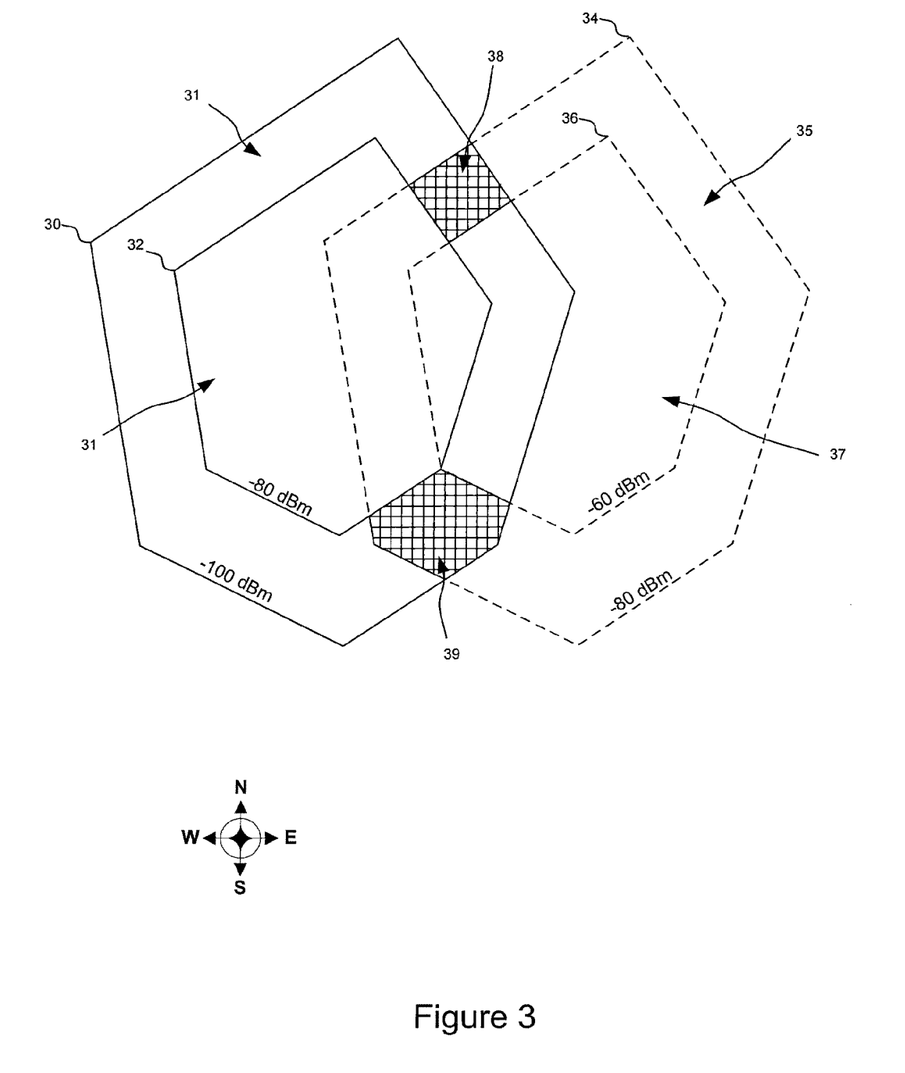
FIG. 3 illustrates an example of multi-region potentials for a receiver.

FIG. 3 illustrates fragmentation in a simple two RF source example. Signal strength of a first RF source (not shown) is represented in a signal strength map by a −100 dBm contour 30 and a −80 dBm contour 32, while signal strength of a second RF source (not shown) is represented in the map by a −80 dBm contour 34 and a −60 dBm contour 36. For the purposes of this example, a wireless device reports a measured signal strength of −94 dBm for the first RF source and a measured signal strength of −72 dBm for the second RF source. Accordingly, the wireless device is determined to lie within a first region 38 or a second region 39.

Figure 4A:
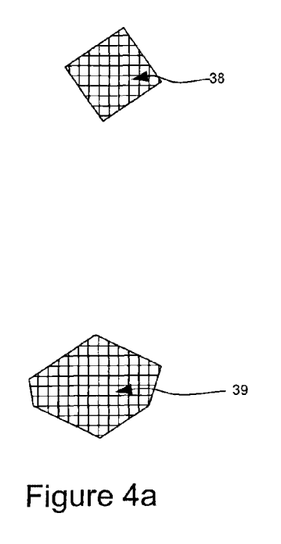
FIG. 4 illustrates an example of a curve fitting process that can be used to generate a single region in which the wireless must reside.
Figure 4B:
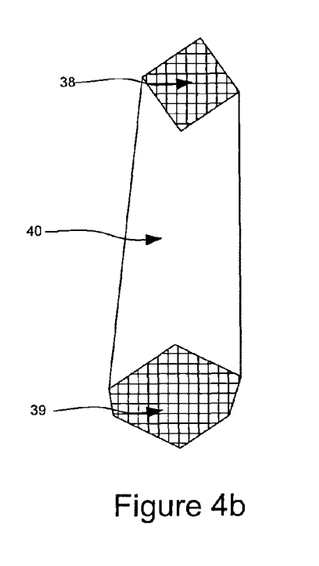
Figure 4C:
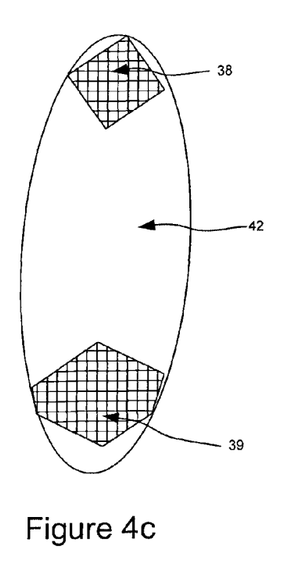
Figure 4D:
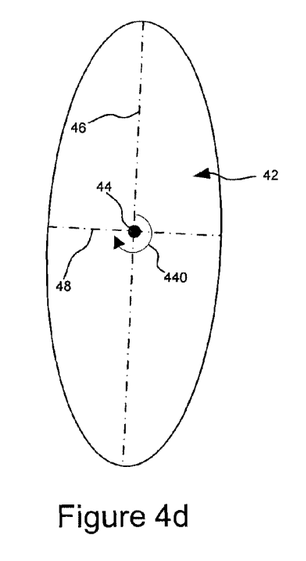

In certain embodiments, it is desirable to construct a single region in which, to a high probability, the wireless device is located. FIGS. 4a-4d illustrates steps of one method for providing a region of high probability in which the wireless device resides, based on the example provided in FIG. 3. Wherein the reporting wireless device is determined to lie within regions 38 and 39, shown in isolation in FIG. 4a. Regions 38 and 39 may be linked to form a single polygonal region 40 as shown in FIG. 4b. Curve fitting techniques may be used to obtain elliptical region 42 calculated from region 40. Elliptical region 42 can be described using simple parameters such as ellipse center location 44, size of major axis 46, size of minor axis 48 and orientation of the ellipse 440 with respect to a geographic axis or other reference axis. Other geometrical shapes can be used to describe the region as desired.

In certain embodiments, a geographical area may be mapped by defining regions of signal coverage. These regions may be fully described using a small number of parameters to describe the shape and size of the region, as shown for elliptical region 42, above. Further, the regions may be indexed using measured signal strengths. Typically, signal strength measurements for each detected signal are obtained and used to generate an index. The index can be used to locate a region in which the measurement for each signal is consistent with the range of expected signal strengths of the signal in the region. The wireless device may then be determined to be located at the region center with a degree of certainty proportional to the size of the area of the region.

In certain embodiments, region information can be maintained in tables and databases that can be indexed by signal strength measurements or ranges of signal strength measurements. In the example discussed above for FIGS. 3 and 4a-4d, a database may be used to relate a measured signal strength of −94 dBm for the first transmitter and a measured signal strength of −72 dBm for the second transmitter with the elliptical region 42 shown in FIG. 4d. In certain embodiments, portions of mapping databases may be maintained in a wireless device. In these embodiments, the wireless device can maintain portions of mapping databases covering immediate geographic areas and geographic areas in which the wireless device is frequently or has recently been located.

In certain embodiments, the region in which a wireless device is located is determined as the intersection of signal strengths or ranges of signal strengths of detectable RF sources. In the example of cellular telephone networks, the wireless device—typically a cellular telephone—may measure signal strengths of a serving base station and neighboring base stations identified by base station cell IDs. The location of the wireless device can be estimated by finding intersections of the coverage areas of the base stations whose cell IDs are reported by the cell phone. The intersections are typically computed in advance and matched with measurements obtained by the cell phone. The intersections of ranges of expected signal strength may be mapped using geometrically defined shapes based on reference signal strengths comprising previously measured signal strengths and modeled signal strengths. For example, each intersection can be transformed or otherwise mapped to an ellipse, where an ellipse center gives the estimated position of the cell phone and the ellipse axes and orientation provide position uncertainty. In real-time an appropriate ellipse can be identified from a table look-up based on bearable cell IDs.

In the cellular telephone network example, X and Y coordinates in the hearable range can be processed to find a convex hull for each base station that forms the coverage area for the base station. Intersections of the coverage area hulls corresponding to the overlapping combinations of base stations can then be obtained. Intersection boundaries joining the intersection vertices can be generated and an ellipse can be fitted to the intersection boundary. The result is typically stored as an ellipse center, semi-major and semi-minor axes and an orientation. In certain embodiments, the convex hull representing cell coverage area may be found using a method described by Joseph O'Rourke[1]. In certain embodiments, intersections may be obtained based on a technique described by B. R. Vatti[2]. In certain embodiments, an ellipse fit to the intersection can be obtained by solving nonlinear equations in least-squares framework using a Newton-Raphson method.

[1] Joseph O'Rourke, *Computational Geometry in C* (2nd Ed.). Cambridge University Press, September 1998.

[2] Vatti, B. R., "A Generic Solution to Polygon Clipping", *Communications of the ACM*, 35(7), July 1992, pp. 56-63.

Figure 5:
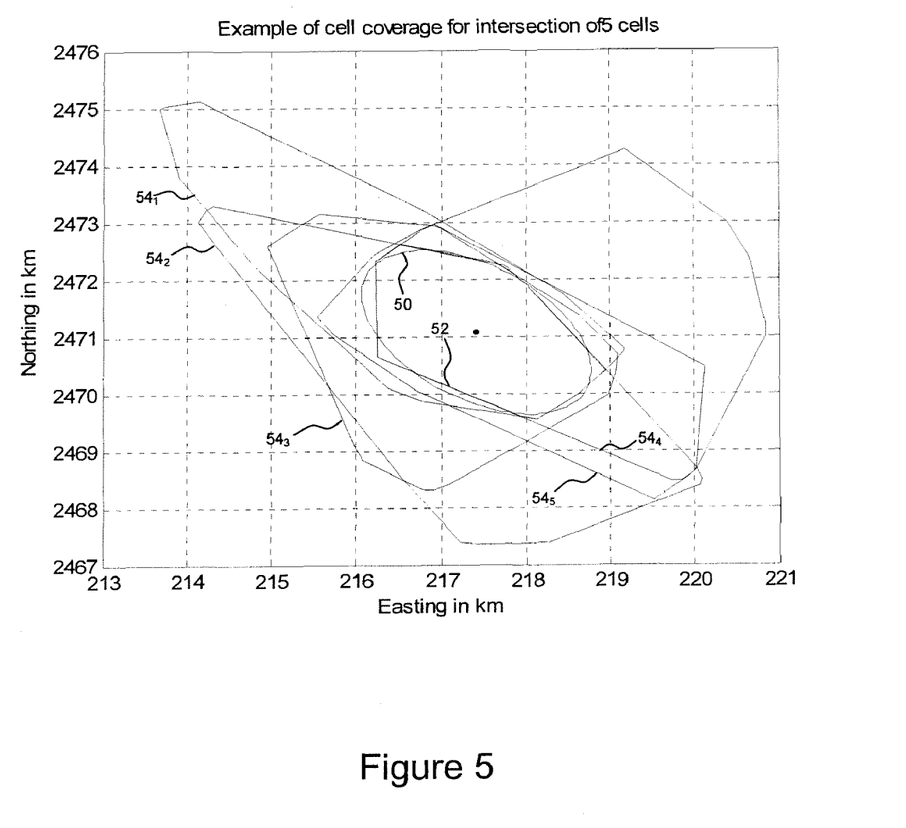
FIG. 5 is an example of a signal strength map for five RF sources.

In certain embodiments, a wireless device may obtain and report measurements of signal strength associated with more than two RF sources. It will be appreciated that the availability of signal strength measurements associated with multiple RF sources may improve mapping granularity and accuracy. FIG. 5 shows a composite signal strength map identifying location of a wireless device in an elliptical region of probability 50 formed from polygon 52 at the intersection of contour lines $54_1$-$54_5$ associated with five different RF sources.

In certain embodiments, measurable signal strengths may be identified with RF sources associated with cellular service provided by plural carriers. It will be appreciated that a wireless device may require roaming privileges with some of the different carriers to be able to precisely identify RF sources associated with some carriers. Cellular services may provide RF sources using different wireless standards and modes. For example, a GSM cellular telephone may be configured for multimode operation and can detect and measure CDMA, TDMA or analog signals.

In certain embodiments, a wireless device may measure signal strength of unrelated RF signals. For example, a wireless device may measure signal strength of both a cellular telephone transmission and an identifiable wireless network such as IEEE 802.11g. In certain embodiments, identifiable wireless data networks may be detectable within an area measured in tens or hundreds of feet and, consequently, can provide higher resolution location information than can be derived from signals received from cellular telephone transmitters. Identifiable data networks can include WiFi networks including IEEE 802.11a, IEEE 802.11b, IEEE 802.11g, Bluetooth, and so on.

In certain embodiments, signal strength measurements can be obtained by wireless devices that can accurately determine location by other means. Such measurements can be used to improve signal strength map resolution and to update stored measurements. Wireless devices that can accurately identify current location include devices equipped with GPS capabilities. In the example of a cellular telephone equipped with a GPS receiver, the telephone can record information corresponding to signal strength measurements for one or more RF sources at a location identified by the GPS receiver. In certain embodiments, such GPS-equipped wireless device can provide the location and signal strength information to databases and mappers using one of the wireless networks.

It will be appreciated that sensitivity of wireless receivers can vary between devices. Therefore, in many embodiments, wireless devices may be calibrated by the mapper. In some embodiments, calibration includes recording measurements of signal strength for one or more wireless transmitters made by a wireless device at known geographical locations. Correction factors can typically be calculated for the wireless device based on comparisons of the measurements with reference signal strength measurements previously obtained at the known locations. Correction factors may be calculated to calibrate the wireless device for operation at different frequencies, in different modes of operations and for different wireless encoding schemes including, for example, CDMA, GSM, TDMA, etc. In certain embodiments, the wireless device may provide information to assist in calibration, including manufacturer, current receiver configuration, battery power level and device calculated correction factors.

In certain embodiments, a history of measurement information can be recorded for a wireless device. Correction factors can be calculated and recalculated based on the history of measurements. Further, changes observed in receiver sensitivity can be recorded and used to provide tolerance information associated with the wireless device. Tolerance information allows the mapper to account for variations in receiver settings caused by environmental and operational factors. For example, signal strength measured by a wireless device may vary with available power in the device. In another example, variation in sensitivity may be associated with differences in wireless device usage including use in a moving vehicle, use outdoors, use indoors and use at different elevations (e.g. different floors of a building). In certain embodiments, heuristic methods may be used to determine if a wireless device is indoors so that appropriate correction factors may be applied to measurements received from the device. In some embodiments, signal strength maps may be adjusted to improve indoor position accuracy. Methods for determining that a wireless device is located indoors include using parameters associated with a number of base stations heard by the wireless device and the mean received signal strength indication (RSSI) of the signals. Appropriate coverage areas can be chosen for weaker signals using RSSI values that are adjusted to be greater than observed values using a tunable factors and offsets. Accordingly, accuracy can be improved because smaller areas of intersection can be obtained since higher RSSI values typically provide smaller corresponding coverage area.

In certain embodiments, a history of measurement information obtained from one or more devices may be aggregated and used to set, reset or otherwise adjust previously determined signal strength measurements, including reference measurements. Such adjustment may be necessitated by changes in transmitter power, changes in topography of the area covered by the RF source, building construction, building demolition, addition or removal of interfering or competing RF sources, and so on. In certain embodiments, the history of measurements may be correlated within a dynamically changing environment where measurements may be affected by factors such as seasonal changes in climate. Thus, in certain embodiments, calibration of a wireless device may include factors addressing short-term and long-term variations in device sensitivity, short-term and long-term variations in transmitter power, short-term and long-term variations in interfering RF sources and factors associated with frequencies detected by the wireless device.

Figure 6:
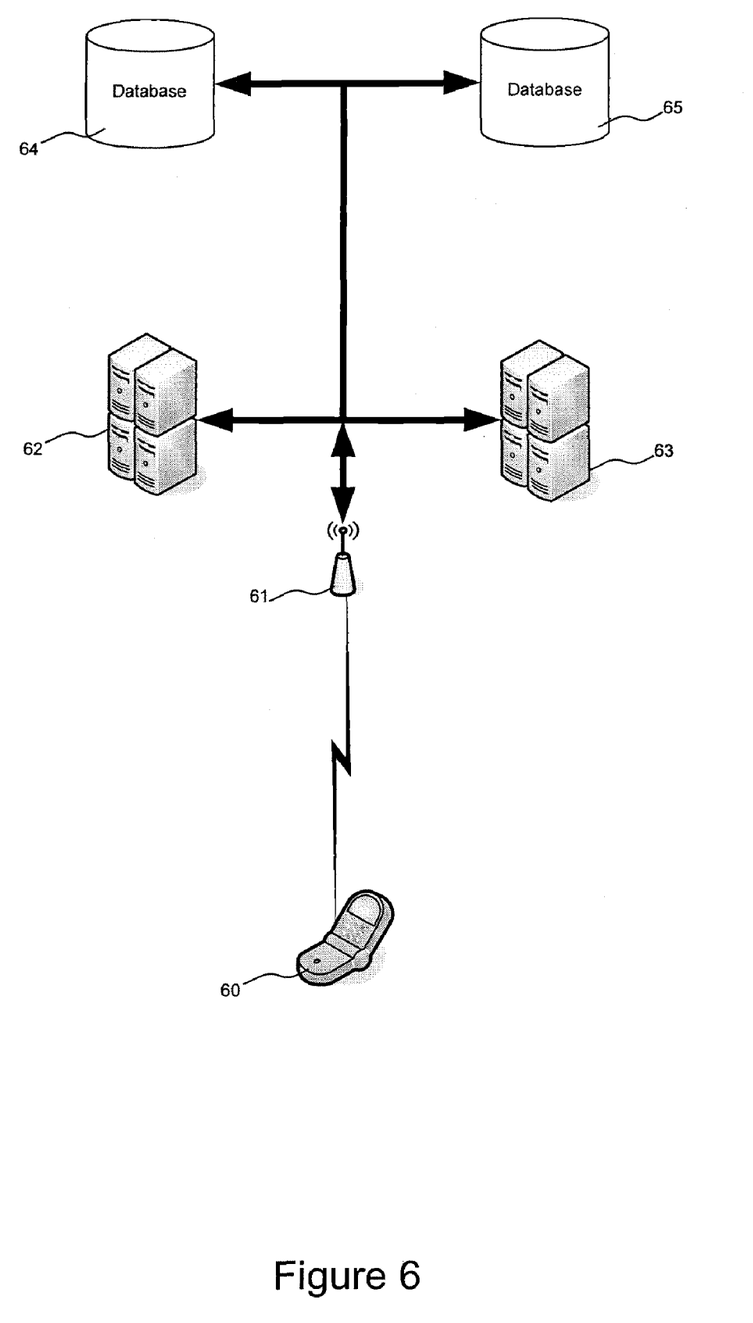
FIG. 6 is a block diagram showing elements of a system used to determine location of a wireless device.

FIG. 6 provides a simplified, illustrative example processing elements included in one embodiment of the invention. A system for gathering signal strength measurements from one or more wireless devices 60 may comprise servers 62 and 63 that are configured and programmed to implement a mapper. In certain embodiments, the system may include one or more databases 64 and 65 for maintaining reference measurements, map information and histories of measurements of signal strength. Typically, servers process measurements received from wireless devices 60, determine location of wireless devices 60 based on the measurements and update reference measurements, map information and histories of measurements of signal strength. In certain embodiments, wireless device 60 can maintain a device-specific database 66 of signal strengths. Device-specific database 66 may be maintained in storage within wireless device 60, on server 62 or 63 in storage indexed to wireless device 60 or in a combination of device storage and server storage. In certain embodiments, signal strength data and maps may be provided by and synchronized with device-specific database 66 by system databases 64 and 65.

Figure 7:
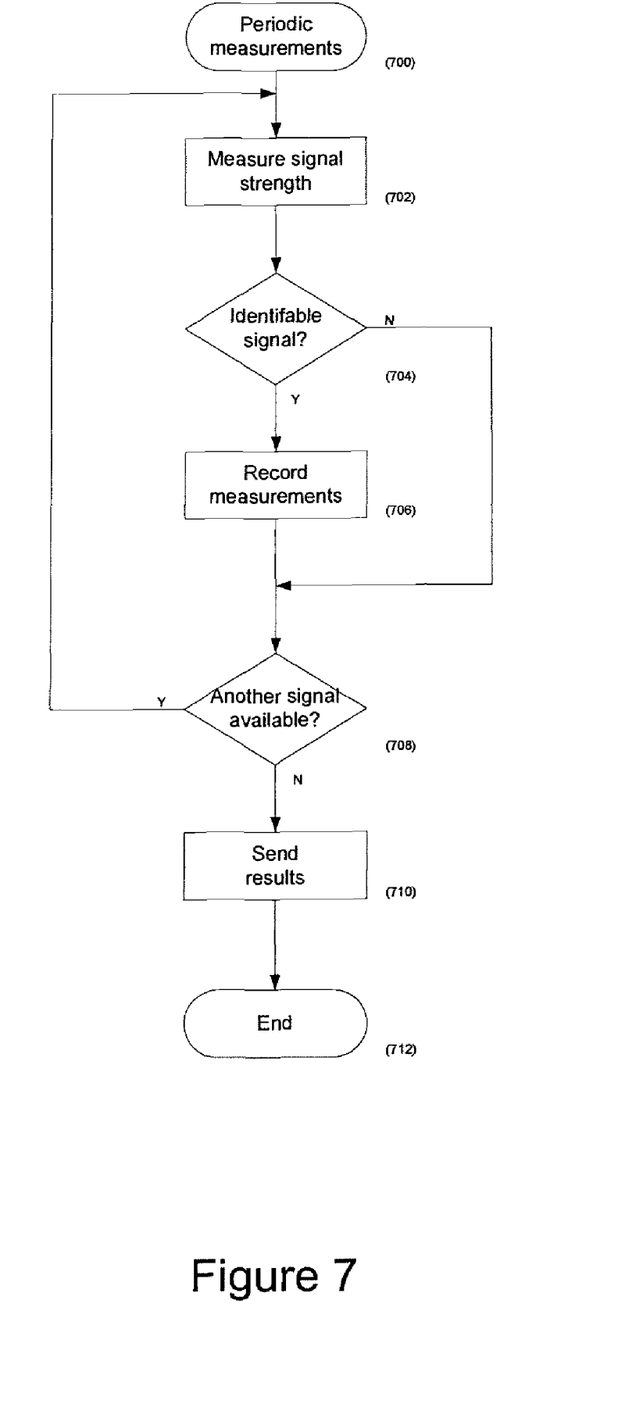
FIG. 7 is a flowchart illustrating measurement of signal strength.

Referring to FIG. 7, in certain embodiments, wireless devices may measure signal strength at regular intervals of time. Intervals may be defined based on wireless network requirements, in association with GPS operation (where available) and at mapper defined intervals. FIG. 7 provides an example of a measurement process 700 employed in one embodiment. At step 702, a wireless device may measure strength of a detected signal that is compatible with the wireless device. In the example of a cellular phone, a signal may be compatible if it is modulated and encoded according to standards such as GSM, CDMA, etc supported by the cellular telephone. Further, the cellular telephone must be able to decode information encoded in the system and the signal must typically be transmitted on behalf of a cellular telephone service provider to which the cellular telephone is subscribed.

At step 704, the signal is processed and, where possible, decoded by the wireless device such that the signal can be identified. A signal may be decoded when the wireless device is configured to selectively demodulate, decrypt and disassemble data provided by the signal. Some signals may be encoded or transmitted according to protocols and standards foreign to the device. Some signals may be provided by a service provider for which the wireless device lacks access authority. If the signal is identifiable, the wireless device records one or more measurements of strength of the signal at step 706. At step 708, where other signals are available, the steps of measuring, identifying and recording are repeated. When all desired identifiable signals have been measured, the results may be transmitted at step 710 to systems for recording, aggregating and processing signal strength measurements.

Figure 8:
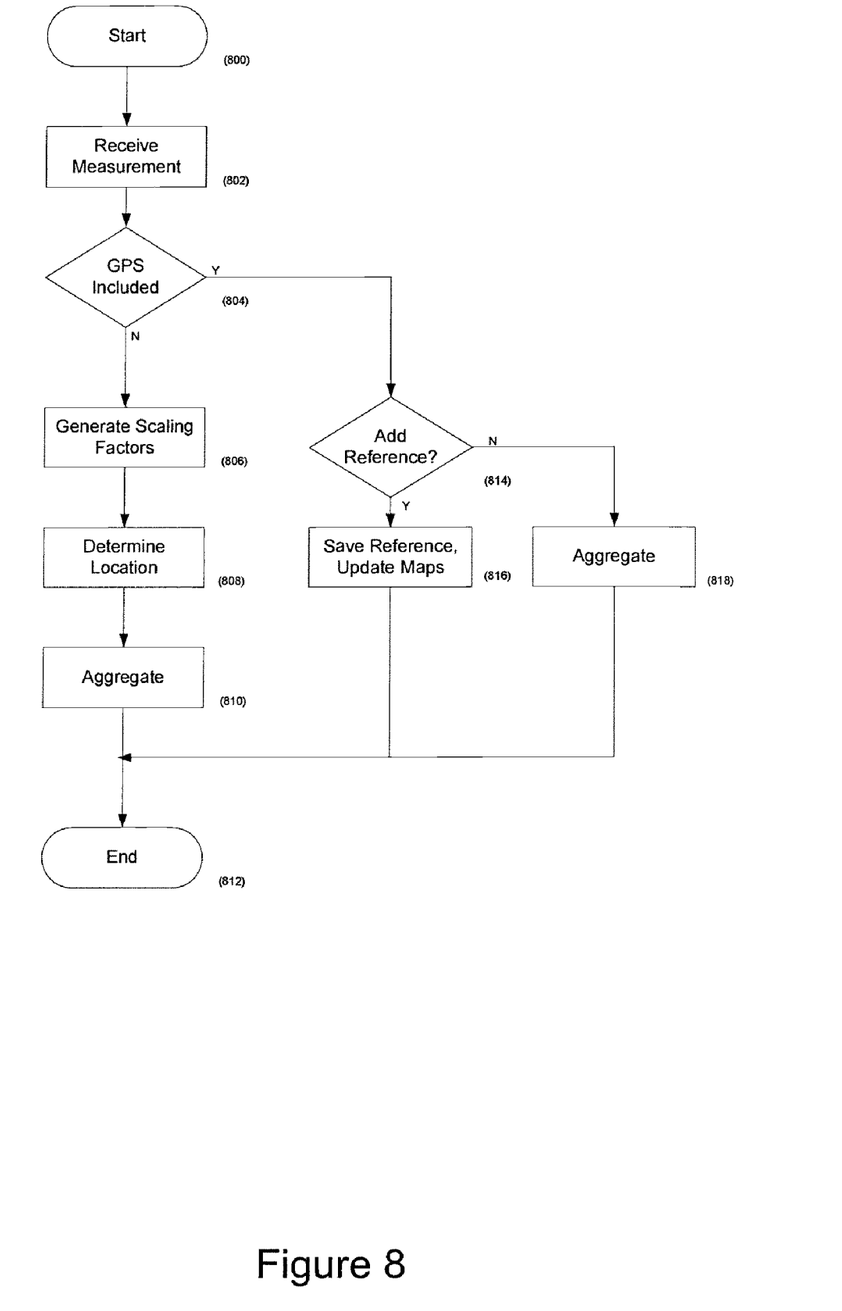
FIG. 8 is flowchart location determination.

FIG. 8 describes a process 800 for recording, aggregating and processing signal strength measurements in certain embodiments of the invention. At step 802, a system receives signal strength measurements from one or more wireless devices. Typically, the signal strength measurements provide additional information that can identify the source of the measured signals. In certain embodiments, the source can be identified by the wireless device by transmitter and service provider. In certain embodiments, the wireless device provides identifying information that can be used to look up a service and transmitter.

At step 804, GPS components can be retrieved with certain of the signal strength information. If GPS information is present, associated measured signal strengths can be used to validate reference information in databases at step 814. If differences are detected between measured signal strengths and reference signal strengths, new reference information can be saved at step 816 or the measurements can be aggregated with other signal strength information. New reference information is typically stored at step 816 when no prior measured information is available for the associated location and the reporting device is considered reliable by the system. Reliability is typically determined using a history of measurements received from the device and consistency with estimated signal strengths for the reported location and with signal strengths measured at neighboring locations. Information is typically aggregated at step 818 to allow statistical analysis of measurements received from a plurality of wireless devices and to allow calibration of the reporting wireless device.

If no GPS information is provided with the signal strength information, then location of the reporting wireless device can be determined. At step 806, calibration information for the device can be used to normalize the signal strength measurements reported by the device. At step 808, the normalized measurements can be used to identify one or more regions in which corresponding reference signal strengths are recorded. Where multiple locations are indicated, secondary factors can be considered, including last known location of the device and a history of locations frequented by the wireless device. At step 810, the raw signal strength measurements can be aggregated with prior measurements by the device from the determined location and with measurements obtained from other devices at the determined location.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for locating a wireless device, comprising the steps of:
    obtaining measured signal strengths of two or more identifiable signals from the wireless device; and
    determining location of the wireless device by comparing the measured signal strengths to reference signal strengths of the two or more identifiable signals,
    wherein the reference signal strengths have associated geographic contours, and wherein the determining includes:
        identifying first and second reference signal strengths between which the measured signal strengths for each of the identifiable signals respectively lie, the associated geographic contours for the first and second reference signal strengths defining an annular region for each of the identifiable signals;
        identifying two or more different intersecting geographic contours between the annular regions for each of the identifiable signals;
        constructing a single region that encompasses both of the two different intersecting geographic contours and has a geometrical shape that is fitted to the geographic contours; and
        computing the determined location using the geometrical shape of the single region.

2. The method of claim 1, wherein each of the one or more identifiable signals is associated with a radio frequency (RF) source.

3. The method of claim 1, wherein each of the one or more identifiable signals provides information identifying an RF source of the each identifiable signal.

4. The method of claim 1, and further comprising the step of identifying an RF source of at least one of the one or more identifiable signals.

5. The method of claim 4, wherein the RF source is identified from information provided in the at least one identifiable signal.

6. The method of claim 4, wherein the step of identifying an RF source includes associating a service provider with the at least one identifiable signal.

7. The method of claim 1, wherein the reference signal strengths include previously obtained measurements of signal strengths of the one or more identifiable signals.

8. The method of claim 7, wherein the previously obtained measurements of signal strengths include signal strengths measured at a plurality of known locations.

9. The method of claim 1, wherein the reference signal strengths include estimated signal strengths of the one or more identifiable signals.

10. The method of claim 9, wherein the estimated signal strengths are obtained by modeling.

11. The method of claim 1, wherein the reference signal strengths include expected signal strengths for the one or more identifiable signals in a known geographical region.

12. The method of claim 10, wherein the expected signal strength values are expressed as ranges of possible signal strengths for the known geographical region.

13. The method of claim 11, wherein location is determined by comparing the measured signal strengths with expected signal strengths in selected geographical regions.

14. The method of claim 1, wherein the measured signal strengths are adjusted using correction factors based on a history of measurements recorded for the wireless device.

15. The method of claim 1, wherein computing the determined location comprises determining a center of the geometrical shape.

16. A system comprising:
a database configured to maintain expected signal strengths of signals within a geographic area;
a mapper for identifying regions of the geographic area wherein each region is characterized by a range of expected signal strengths for each of one or more of the signals detectable in the each region; and
one or more servers for locating a wireless device in one of the identified regions based on signal strengths measured by the wireless device,
wherein the expected signal strengths have associated geographic contours, and wherein the servers locate the wireless device by:
identifying first and second expected signal strengths between which the measured signal strengths for each of the identifiable signals respectively lie, the associated geographic contours for the first and second expected signal strengths defining an annular region for each of the identifiable signals;
identifying two or more different intersecting geographic contours between the annular regions for each of the identifiable signals;
constructing a single region that encompasses both of the two different intersecting geographic contours and has a geometrical shape that is fitted to the geographic contours; and
computing the determined location using the geometrical shape of the single region.

17. The system of claim 16, wherein certain of the expected signal strengths are based on signal strengths measured at known locations within the geographic area.

18. The system of claim 16, wherein certain of the expected signal strengths include estimated signal strengths for selected locations within the geographic area.

19. The system of claim 16, wherein sources of the signals are identifiable.

20. The system of claim 19, wherein the sources include a cellular telephone system base station.

21. The system of claim 19, wherein the sources include a WiFi base station.

22. The system of claim 17, wherein the measured signal strengths include signal strengths measured by a GPS-equipped wireless device.

23. The system of claim 18, wherein the estimated signal strengths are obtained by modeling.

24. The system of claim 16, wherein the wireless device is located based on an intersection of signal strengths of signals received from two or more RF sources.

25. The system of claim 16, wherein computing the determined location comprises determining a center of the geometrical shape.

* * * * *

UNITED STATES PATENT AND TRADEMARK OFFICE
CERTIFICATE OF CORRECTION

PATENT NO. : 8,364,164 B2
APPLICATION NO. : 11/464186
DATED : January 29, 2013
INVENTOR(S) : Phatak et al.

Page 1 of 1

It is certified that error appears in the above-identified patent and that said Letters Patent is hereby corrected as shown below:

In the Specifications

In Column 2, Line 54, delete "Whenever" and insert -- Wherever --, therefor.

In Column 2, Line 55, delete "toe" and insert -- the --, therefor.

Signed and Sealed this
Eleventh Day of June, 2013

Teresa Stanek Rea
*Acting Director of the United States Patent and Trademark Office*